United States Patent
Herron

(10) Patent No.: US 11,538,290 B1
(45) Date of Patent: Dec. 27, 2022

(54) AUTOMATED VEHICLE DIAGNOSTIC NAVIGATION SYSTEM AND METHOD

(71) Applicant: Opus IVS, Inc., Ann Arbor, MI (US)

(72) Inventor: Brian J. Herron, Dexter, MI (US)

(73) Assignee: Opus IVS, Inc., Ann Arbor, MI (US)

( * ) Notice: Subject to any disclaimer, the term of this patent is extended or adjusted under 35 U.S.C. 154(b) by 195 days.

(21) Appl. No.: 16/778,880

(22) Filed: Jan. 31, 2020

(51) Int. Cl.
   *G07C 5/08* (2006.01)
   *G06Q 10/00* (2012.01)
   *G07C 5/00* (2006.01)

(52) U.S. Cl.
   CPC .......... *G07C 5/0808* (2013.01); *G06Q 10/20* (2013.01); *G07C 5/008* (2013.01); *G07C 5/0841* (2013.01); *G07C 2205/02* (2013.01)

(58) Field of Classification Search
   CPC .... G07C 5/0808; G07C 5/008; G07C 5/0841; G07C 2205/02; G06Q 10/20
   See application file for complete search history.

(56) References Cited

U.S. PATENT DOCUMENTS

| | | |
|---|---|---|
| 6,154,658 A | 11/2000 | Caci |
| 6,728,603 B2 | 4/2004 | Pruzan et al. |
| 6,879,894 B1 | 4/2005 | Lightner et al. |
| 6,956,501 B2 | 10/2005 | Kitson |
| 7,092,803 B2 | 8/2006 | Kapolka et al. |
| 7,373,226 B1 | 5/2008 | Cancilla et al. |
| 7,502,672 B1 | 3/2009 | Kolls |
| 7,519,458 B2 | 4/2009 | Buckley |
| 7,532,962 B1 | 5/2009 | Lowrey et al. |
| 7,584,030 B1 | 9/2009 | Graham |

(Continued)

FOREIGN PATENT DOCUMENTS

WO   2004092857 A2   10/2004

OTHER PUBLICATIONS

Article entitled "Remote Vehicle Diagnostic System Using Mobile Handsets" by Doo-Hee Jung, Gu-Min Jeong, and Hyun-Sik Ahn, understood to be from the proceedings of the Jun. 2006 International Conference on Wireless Networks, ICWN 2006, Las Vegas, Nevada.

(Continued)

*Primary Examiner* — Michael V Kerrigan
(74) *Attorney, Agent, or Firm* — Gardner, Linn, Burkhart & Ondersma LLP

(57) ABSTRACT

An automated vehicle diagnostic navigation system and method includes a diagnostic computer having a diagnostic application program operable to perform a diagnostic evaluation of a vehicle by performing a diagnostic scan of an electronic system of the vehicle, where the diagnostic application program includes a hierarchical structure for initiation of a diagnostic scan of the vehicle based on the make, model and year of the vehicle, and includes a diagnostic navigation program configured to interface with the diagnostic application program, with the diagnostic navigation program configured to receive an input of the make, model and year of the vehicle. The diagnostic navigation program is operable to provide automated sequential inputs to the diagnostic application program based on the make, model and year of the vehicle to navigate the hierarchical structure of the diagnostic application program to initiate and perform a diagnostic scan of the vehicle.

21 Claims, 6 Drawing Sheets

(56) References Cited

U.S. PATENT DOCUMENTS

| | | | |
|---|---|---|---|
| 7,786,851 B2 | 8/2010 | Drew et al. |
| 7,840,812 B1 | 11/2010 | Levenberg |
| 7,928,837 B2 | 4/2011 | Drew et al. |
| 8,190,322 B2 | 5/2012 | Lin et al. |
| 8,259,936 B2 | 9/2012 | Mahalingaiah |
| 8,306,687 B2 | 11/2012 | Chen |
| 8,339,254 B2 | 12/2012 | Drew et al. |
| 8,352,577 B2 | 1/2013 | Martone |
| 8,638,207 B2 | 1/2014 | Drew et al. |
| 8,688,313 B2 | 4/2014 | Margol et al. |
| 8,909,416 B2 | 12/2014 | Chen et al. |
| 8,918,245 B2 | 12/2014 | Dewhurst et al. |
| 9,430,884 B2 | 8/2016 | Drew et al. |
| 9,530,255 B2 | 12/2016 | Drew et al. |
| 9,563,988 B2 | 2/2017 | Drew et al. |
| 9,646,130 B2 | 5/2017 | Drew et al. |
| 10,013,816 B2 | 7/2018 | Nassar et al. |
| 10,146,521 B2 | 12/2018 | West et al. |
| 10,181,225 B2 | 1/2019 | Liebl et al. |
| 10,282,924 B2 | 5/2019 | Drew et al. |
| 10,414,277 B1 | 9/2019 | Herron et al. |
| 10,445,953 B1 | 10/2019 | Herron et al. |
| 10,706,645 B1 | 7/2020 | Herron et al. |
| 10,719,813 B1 | 7/2020 | Beckmann et al. |
| 10,748,356 B1 | 8/2020 | Herron et al. |
| 11,062,534 B2 | 7/2021 | Jingle et al. |
| 2001/0056544 A1 | 12/2001 | Walker |
| 2003/0001720 A1 | 1/2003 | Wade et al. |
| 2003/0020759 A1 | 1/2003 | Cancilla et al. |
| 2004/0044454 A1 | 3/2004 | Ross et al. |
| 2004/0167689 A1 | 8/2004 | Bromley et al. |
| 2005/0021294 A1 | 1/2005 | Trsar et al. |
| 2005/0038581 A1 | 2/2005 | Kapolka et al. |
| 2005/0060070 A1 | 3/2005 | Kapolka et al. |
| 2005/0182537 A1 | 8/2005 | Tefft et al. |
| 2005/0240555 A1 | 10/2005 | Wilde et al. |
| 2005/0251304 A1 | 11/2005 | Cancellara et al. |
| 2006/0052921 A1 | 3/2006 | Bodin et al. |
| 2006/0106508 A1 | 5/2006 | Liebl et al. |
| 2006/0211446 A1 | 9/2006 | Wittmann et al. |
| 2007/0005201 A1 | 1/2007 | Chenn |
| 2007/0043488 A1 | 2/2007 | Avery et al. |
| 2007/0050105 A1 | 3/2007 | Chinnadurai et al. |
| 2007/0055420 A1 | 3/2007 | Krzystofczyk et al. |
| 2007/0073460 A1 | 3/2007 | Bertosa et al. |
| 2007/0185624 A1 | 8/2007 | Duddles et al. |
| 2007/0233340 A1 | 10/2007 | Raichle et al. |
| 2008/0177438 A1 | 7/2008 | Chen et al. |
| 2008/0269975 A1 | 10/2008 | Bertosa |
| 2008/0280602 A1 | 11/2008 | Ban |
| 2008/0306645 A1 | 12/2008 | Dewhurst et al. |
| 2009/0062978 A1 | 3/2009 | Picard |
| 2009/0118899 A1 | 5/2009 | Carlson |
| 2009/0119657 A1 | 5/2009 | Link, II |
| 2009/0187976 A1 | 7/2009 | Perroud et al. |
| 2009/0265055 A1 | 10/2009 | Gillies |
| 2009/0276115 A1 | 11/2009 | Chen |
| 2010/0042287 A1 | 2/2010 | Zhang |
| 2010/0174446 A1 | 7/2010 | Andreasen et al. |
| 2010/0204878 A1 | 8/2010 | Drew et al. |
| 2010/0205450 A1 | 8/2010 | Samacke et al. |
| 2010/0262335 A1 | 10/2010 | Brozovich |
| 2011/0071709 A1 | 3/2011 | Damiani et al. |
| 2011/0112718 A1 | 5/2011 | Claus et al. |
| 2011/0153150 A1 | 6/2011 | Drew et al. |
| 2011/0276218 A1 | 11/2011 | Dwan |
| 2011/0313593 A1 | 12/2011 | Cohen et al. |
| 2012/0046826 A1 | 2/2012 | Panko |
| 2012/0254345 A1 | 10/2012 | Montoya |
| 2017/0301154 A1 | 10/2017 | Rozint |
| 2019/0050458 A1* | 2/2019 | Merg .................. G07C 5/006 |

OTHER PUBLICATIONS

Thesis entitled "Remote Connection of Diagnostic Tool" by Irina Elena Apetri and Ali Raza, Chalmers University of Technology, dated 2011.

* cited by examiner

AUTOMATED VEHICLE DIAGNOSTIC NAVIGATION SYSTEM AND METHOD

BACKGROUND OF THE INVENTION

The present invention is directed to a vehicle diagnostic system and method, and in particular a system and method utilizing an automated diagnostic navigation system for operating the hierarchical structure of diagnostic applications to obtain vehicle diagnostic data information from a diagnostic evaluation for various vehicles.

Vehicle diagnostic systems employing diagnostic scan devices or tools are used in automotive repair facilities to diagnose and repair computer-based vehicle systems, where vehicles may have differing computer-based systems depending on the configuration and options installed on the vehicle. Vehicle diagnostic scan systems may include or use one or more diagnostic software scanning programs or applications, such as applications developed by an original equipment automotive manufacturer ("OEM"), or an after-market diagnostic company. The diagnostic software scanning programs are used to diagnose the electronic system of a vehicle and result in a scan log file that includes information of faults in the system. Different diagnostic applications are used with different makes of vehicles, with different models of vehicles including particular engine control units ("ECU") such that different procedures are used to perform diagnostic evaluations, including depending on the make, model and year of vehicle, as well as based on other parameters.

SUMMARY OF THE INVENTION

The present invention provides a vehicle diagnostic system and method utilizing an automated hierarchical diagnostic navigation program that operates to navigate through diagnostic applications based on vehicle parameters to expedite diagnostic evaluations of vehicles.

According to an aspect of the present invention, a vehicle diagnostic system and method includes a diagnostic computer having one or more diagnostic application programs operable to perform a diagnostic evaluation of a vehicle by performing a diagnostic scan of an electronic system of the vehicle, where the diagnostic application programs include a hierarchical structure for initiation of a diagnostic scan of the vehicle based at least on the make, model and year of the vehicle, and includes a diagnostic navigation program configured to interface with the diagnostic application program, wherein the diagnostic navigation program is configured to receive an input of the make, model and year of the vehicle. The diagnostic navigation program is operable to provide automated sequential inputs to the diagnostic application program based on the make, model and year of the vehicle to navigate the hierarchical structure of the diagnostic application program to initiate and perform the diagnostic scan of the vehicle.

In accordance with particular embodiments of the invention, the diagnostic navigation program may reside on the diagnostic computer, or on a remote diagnostic computer. Multiple diagnostic navigation programs may be provided, and the diagnostic computer may additionally include multiple diagnostic application programs configured for use with different makes, models and/or years of vehicles.

In a still further embodiment, the diagnostic navigation program is configured to receive a manually input entry by an operator via the diagnostic computer of the make, model and year of the vehicle. Alternatively and/or additionally, the system may utilize a vehicle interface device to receive a vehicle identification number from the vehicle at the diagnostic computer, where the vehicle identification number includes indicia that can be parsed to obtain the make, model and year of the vehicle. The vehicle diagnostic system and method may additionally be configured to utilize selective manual inputs by an operator via the diagnostic computer, in addition to automated inputs form the diagnostic navigation program to initiate and perform the diagnostic scan of the vehicle.

In accordance with a further aspect of the invention, the diagnostic computer includes a controller, such as a keyboard controller or another controller, with the diagnostic navigation program being operable to provide automated sequential inputs to the diagnostic application program via the controller.

The diagnostic system and method in accordance with the present invention employing a diagnostic navigation program that is operable to select a given diagnostic application program to be run and/or provide control or input signals to a diagnostic application program without operator input enables the diagnostic application program to be used to perform a diagnostic evaluation of a vehicle under test without the need for extensive operator input, thereby automating and expediting the diagnostic evaluation process, while removing a potential source of human error in conducting a diagnostic evaluation. These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
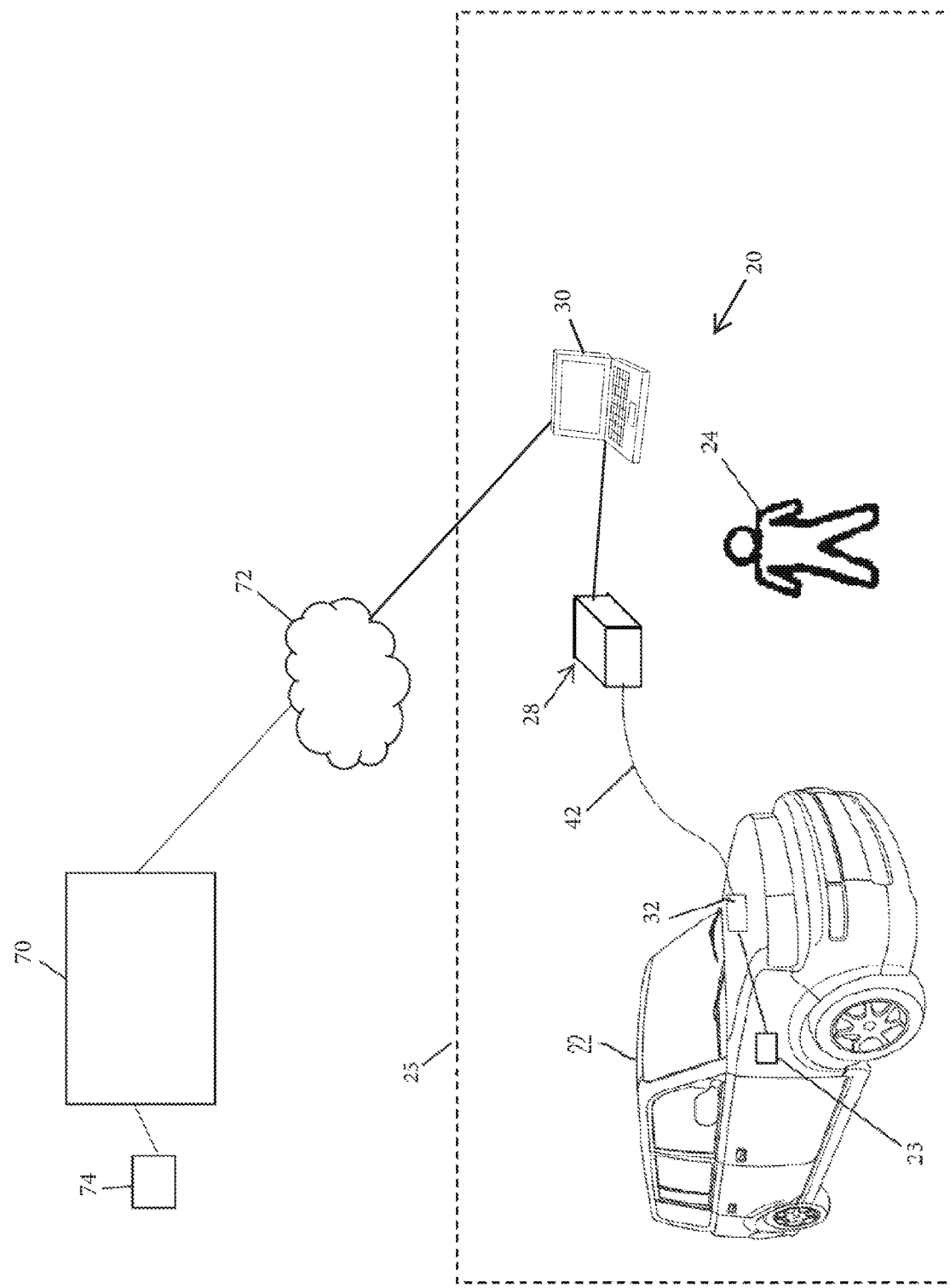
FIG. 1 is a schematic illustration of a vehicle diagnostic system in use with a vehicle in accordance with the present invention utilizing an automated diagnostic navigation program.
Figure 2:
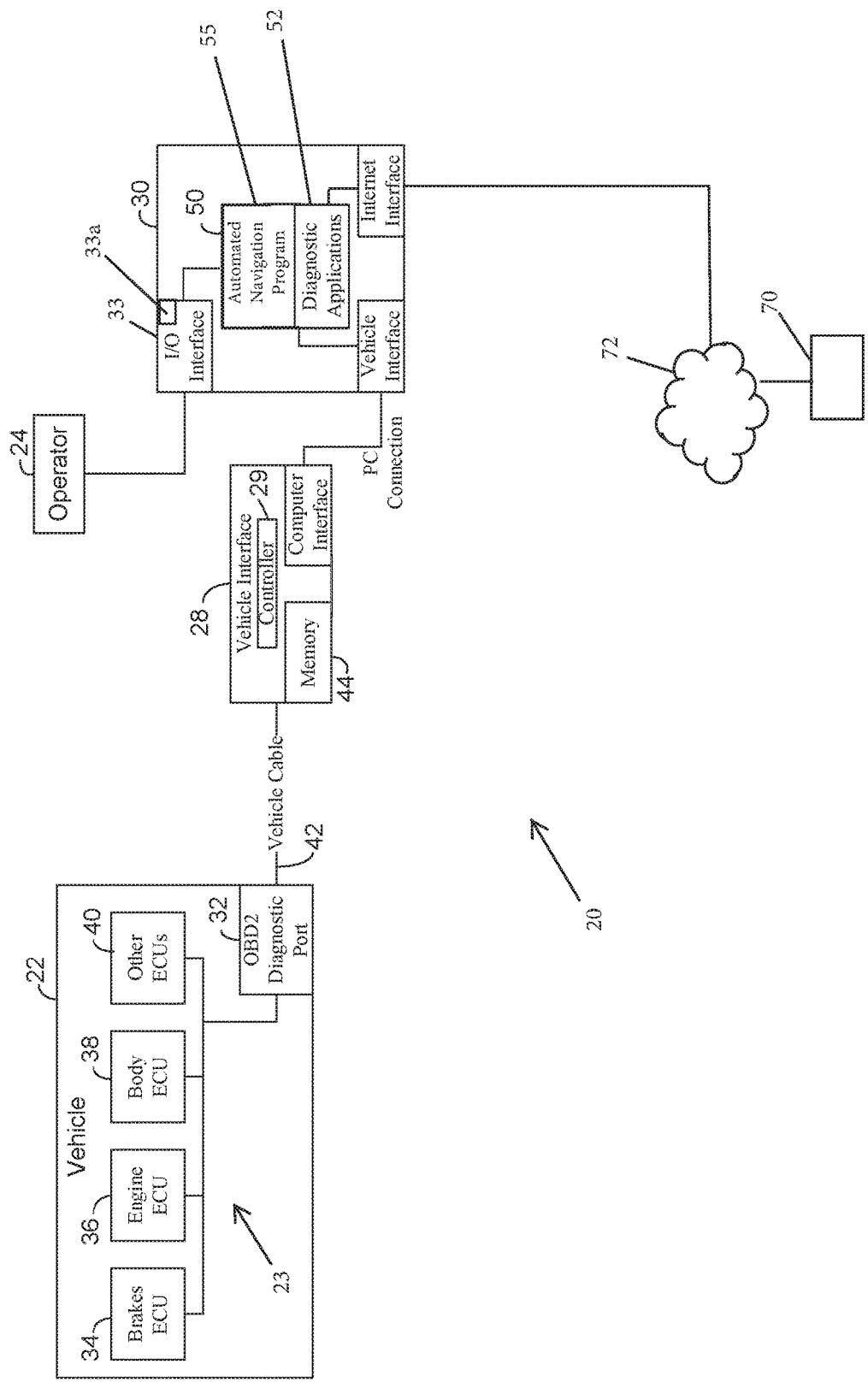
FIG. 2 is a detailed block diagram of the computer, vehicle interface and vehicle electrical system of FIG. 1.

With reference to FIGS. 1 and 2, a vehicle diagnostic system 20 for use with a vehicle 22 is shown for use by a mechanic or operator 24, such as in an automotive repair facility 25. System 20 is illustrated as including a vehicle diagnostic tool, referred to as a vehicle interface device or interface tool 28 that is communicatively coupled to a local computer 30. In use, vehicle interface device 28 is connected with vehicle 22 by operator 24, such as by connecting to an on-board diagnostic ("OBD") diagnostic port 32 of the vehicle 22 in order to diagnose the electronic system 23 of vehicle 22, including to diagnose various vehicle electronic control units (ECUs), such as an engine ECU 34, body ECU 36, brakes ECU 38, and/or other ECUs 40, and/or other electronic parts and components of vehicle 22. Vehicle interface device 28 connects with port 32, such as via vehicle cable 42.

Vehicle interface device 28 includes a controller 29, such as in the form of a processor or micro-processor and interface circuitry to facilitate communication between the ECUs and the interface tool 28, with interface tool 28 including a database of vehicle protocols found in a local memory 44 that allow communication with the ECUs of various makes and models of vehicles. Vehicle interface device 28 additionally includes a computer interface 46 for connection with computer 30, such as via standard interfaces 74, such as USB, Bluetooth, Wi-Fi, or the like. Vehicle diagnostic system 20 may be configured to be selectively operable in one of a plurality of different modes, whereby a technician may use the interface device 28 for vehicle maintenance, diagnosis, programming and repair as needed.

In the illustrated embodiment system 20 includes computer 30, which includes diagnostic applications or diagnostic application scanning tools 52 stored in memory 50 for scanning the electronic system 23 of vehicle 22 with a diagnostic application scanning program, such as one or more different diagnostic application scanning programs 53a, 53b, 53c (FIG. 4) stored in memory 50 of local computer 30, where a given scanning program is run depending on, for example, the make, model and year of vehicle via one or more processors of computer 30. In order for the appropriate diagnostic application program 53a, 53b, 53c to be launched to perform a diagnostic evaluation on the electronic system 23 of vehicle 22, it is necessary that computer 30 be used to navigate through various parameters to select the correct diagnostic application scanning program 53 for the vehicle 22 under evaluation, where navigation may be performed by operator 24 in response to queries or prompts displayed on screen 31 of computer 30 using keyboard 33. This can include, for example, selectively navigating to select the correct diagnostic application scanning program 53 based on the make, model and year of vehicle 22. Still further, performance of a diagnostic evaluation may additionally include navigating the hierarchical structure of the diagnostic applications 53a, 53b, 53c themselves for performing a diagnostic evaluation using one of the diagnostic application programs 53a, 53b, 53c, for example, by selection of desired operational parameters of the diagnostic application program, identification of vehicle brands, designation of particular vehicle electronic subsystems, and/or identification of vehicle accessories, engine and/or transmission types, and the like.

Figure 3:
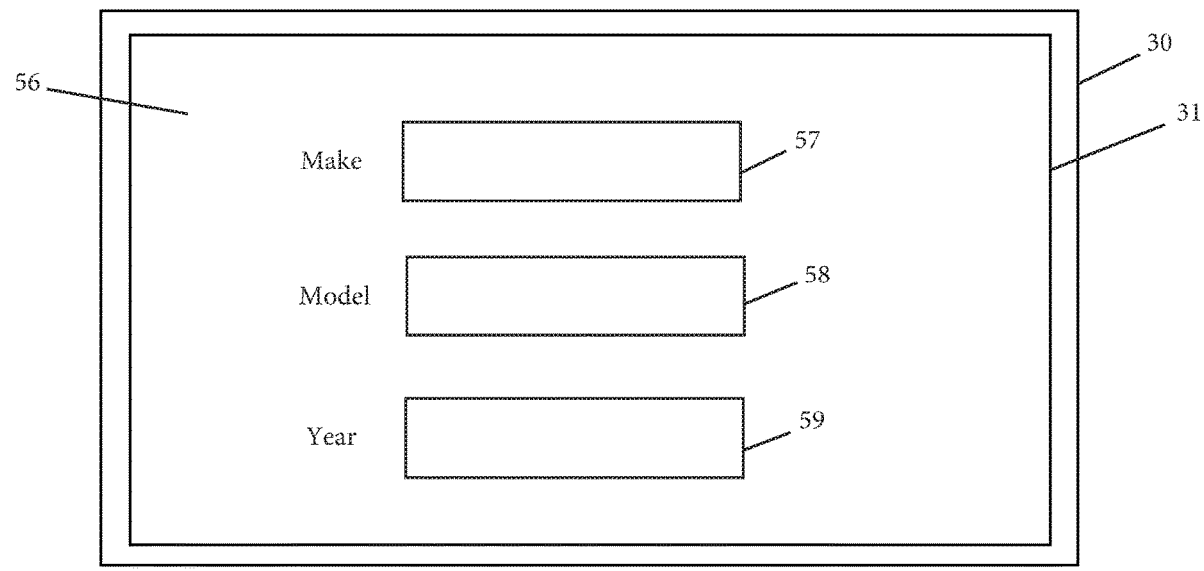
FIG. 3 is a schematic illustration of input fields on the computer of FIG. 1 for use with the diagnostic navigation program.

In accordance with an embodiment of the present invention, computer 30 is provided with automated diagnostic navigation program 55 that is operable to both select a given diagnostic application program to be run, as well as provide control or input signals to diagnostic application programs 53a, 53b, 53c without operator input whereby the diagnostic application programs 53a, 53b 53c may be used to perform a diagnostic evaluation of the vehicle under test without the need for extensive operator input, thereby automating and expediting the diagnostic evaluation process, while removing a potential source of human error in conducting a diagnostic evaluation. In the illustrated embodiment, for example, during startup of system 20, navigation program 55 may be used to provide an initialization display 56 having input fields 57, 58, 59 on screen 31 of computer 30 as shown in FIG. 3, where input fields correspond to the requested make, model and year, respectively, of the vehicle 22 that is under evaluation. Upon operator 24 entering the requested inputs into navigation program 55 using keyboard 33, navigation program 55 proceeds to select and launch the appropriate diagnostic applications 53a, 53b, 53c, as well as automatically navigate the hierarchical structure of the selected diagnostic application program to perform the diagnostic scan of ECUs of vehicle 22.

As understood from FIGS. 4A-4E, the selected diagnostic application 53 of available diagnostic applications 53a, 53b, 53c includes a hierarchical structure for performing a diagnostic evaluation, where inputs to the diagnostic application 53 are required to cause the diagnostic application 53 to perform the desired diagnostic evaluation. By way of example, FIG. 4A discloses a main menu input display 60 with selectable options for performing diagnostics F0, viewing previously captured data F1, and accessing options of diagnostic application 53. Rather than requiring operator 24 to make a manual entry via keyboard 33, diagnostic navigation program 55 provides a predetermined input to diagnostic application 53, which in the case of performing a diagnostic evaluation of the electronic system 23 of vehicle 22 involves diagnostic navigation program 55 providing an input to diagnostic application 53 to select diagnostics F0.

Inputs provided by diagnostic navigation program 55 to a diagnostic application program 53 may be provided in the form of signals in like manner to that which would be provided by keyboard 33. For example, the diagnostic navigation program 55 provides a predetermined character or key signal for each navigated branch of the diagnostic application 53 corresponding to the hierarchical structures of the diagnostic application program 53 that must be navigated to perform a vehicle scan. The key signal may be sent directly to the diagnostic application program 53. Alternatively, the key signal may be sent to a controller of the computer 30, such as to the keyboard controller 33a, where the keyboard controller 33a comprises an integrated circuit that in turn forwards the key signal to the diagnostic application.

Figure 4A:
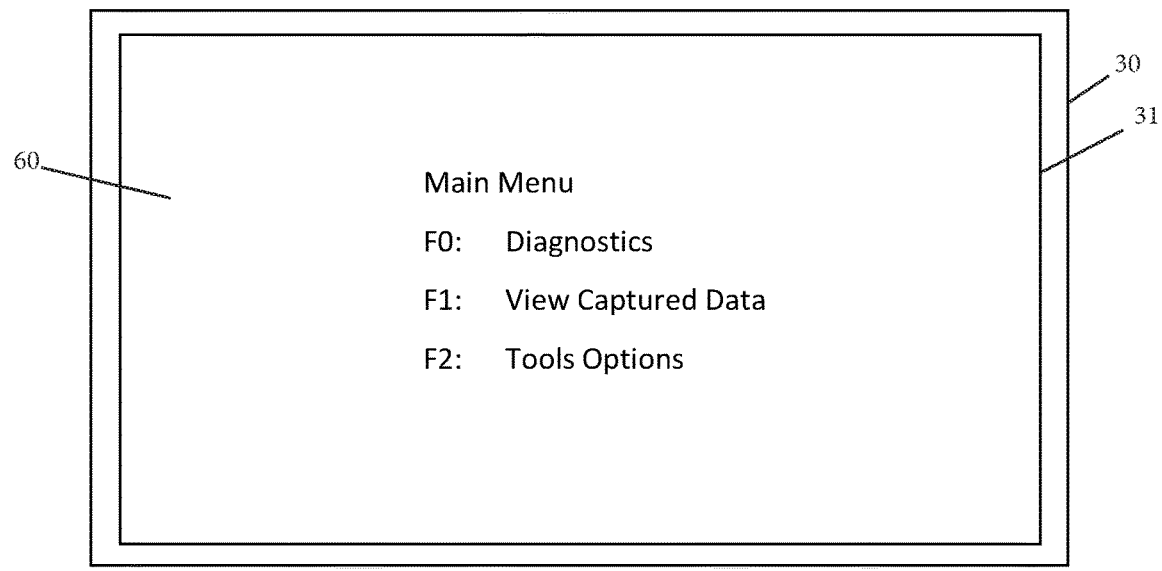
FIGS. 4A-4E are illustrative views of the computer of FIG. 1 operating through the hierarchical structure of a diagnostic application for performing a diagnostic evaluation.
Figure 4B:
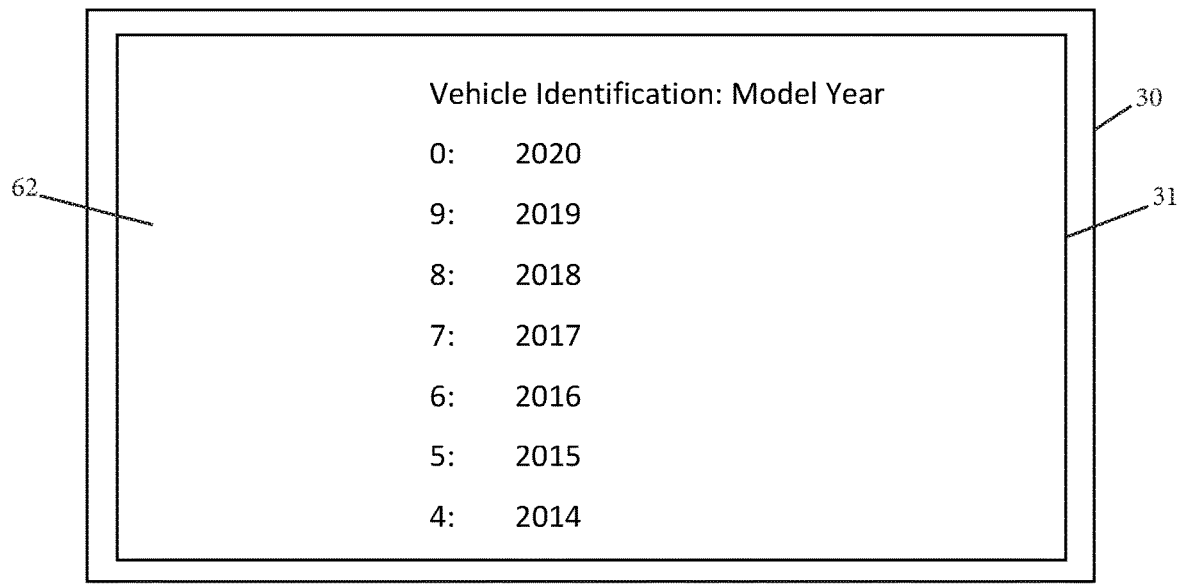

As illustrated in FIG. 4B, upon selection of diagnostics F0, the hierarchical structure of diagnostic application 53 subsequently provides an initial vehicle identification display 62, which in the illustrated embodiment includes selectable options for inputting the year of the vehicle 22 under evaluation. Again, rather than requiring operator 24 to make a manual entry via keyboard 33, diagnostic navigation program 55 provides an automated predetermined input to diagnostic application 53 to select the year.

Figure 4C:
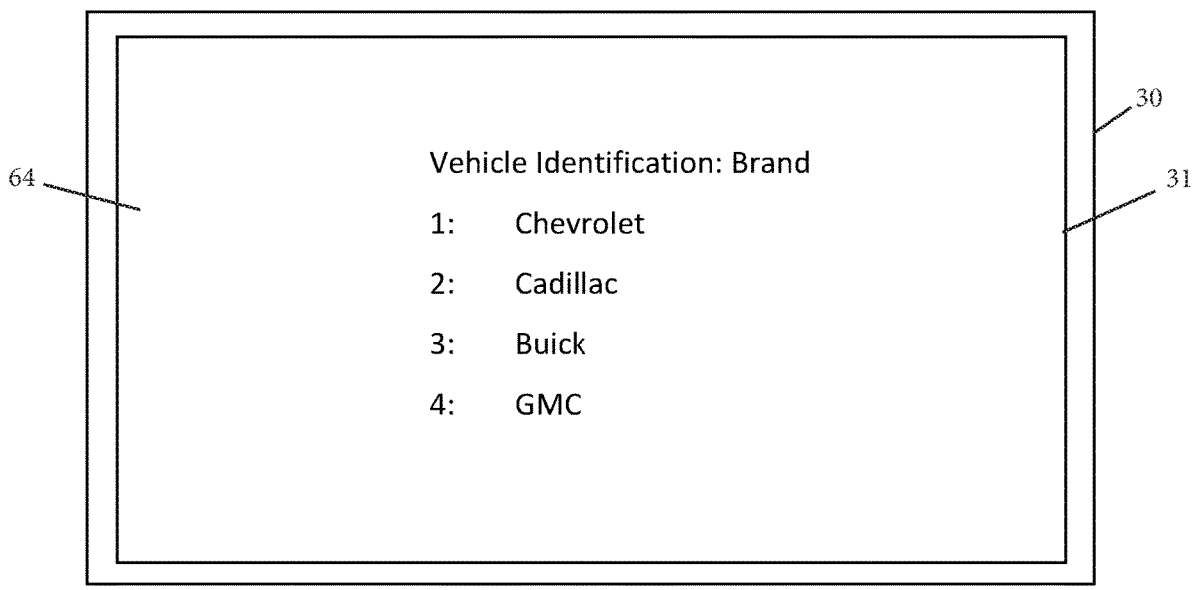

As illustrated in FIG. 4C, after diagnostic navigation program 55 provides an input signal of the vehicle year, the hierarchical structure of diagnostic application 53 subsequently provides a further vehicle identification display 64, which in the illustrated embodiment includes selectable options for the vehicle make. Instead of operator 24 making a manual entry via keyboard 33, diagnostic navigation program 55 provides an automated predetermined input to diagnostic application 53 to select the make, such as that previously entered by the operator 24 at the initialization display 56.

Figure 4D:
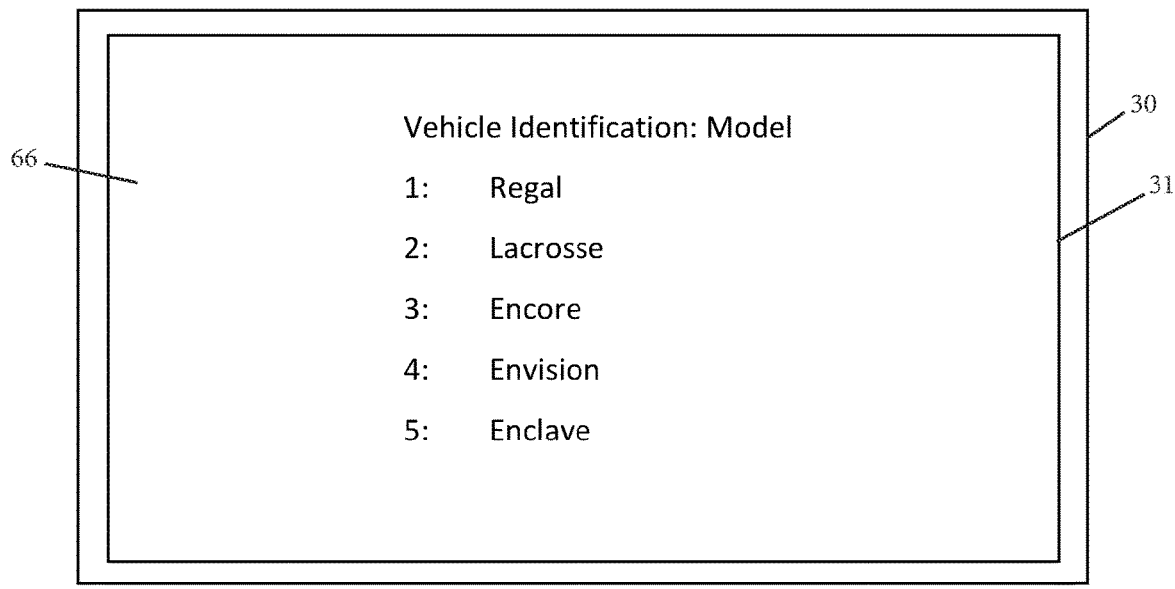

As illustrated in FIG. 4D, after diagnostic navigation program 55 provides an input signal of the vehicle make, the hierarchical structure of diagnostic application 53 subsequently provides a further vehicle identification display 66, which in the illustrated embodiment includes selectable options for the vehicle model. Instead of operator 24 making a manual entry via keyboard 33, diagnostic navigation program 55 provides an automated predetermined input to diagnostic application 53 to select the model, such as that previously entered by the operator 24 at the initialization display 56.

Figure 4E:
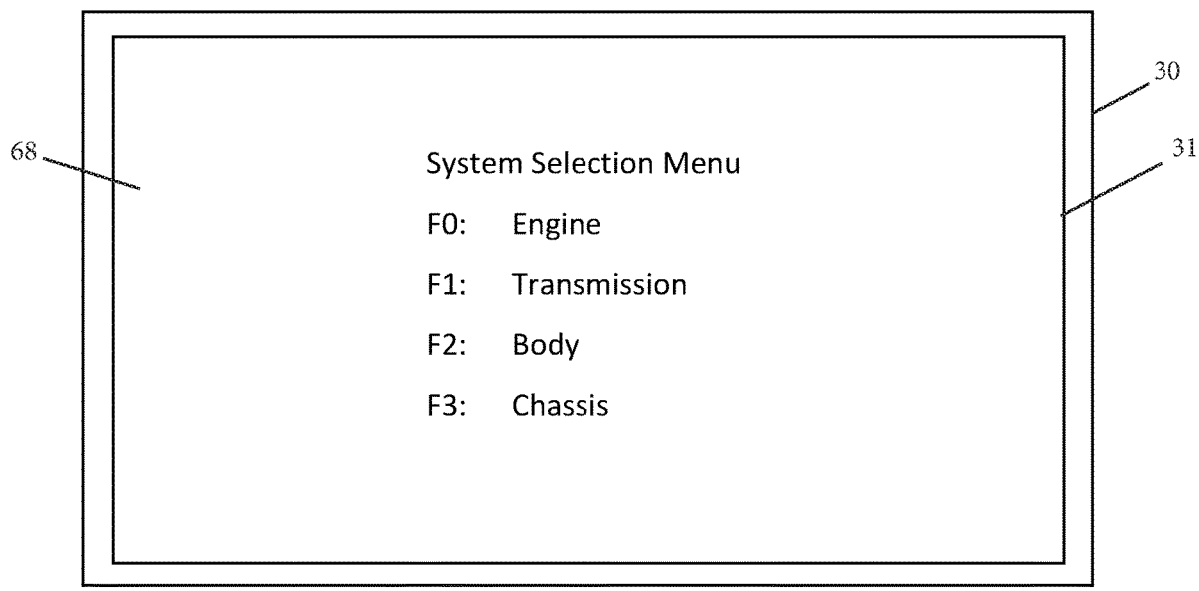
Figure 5:
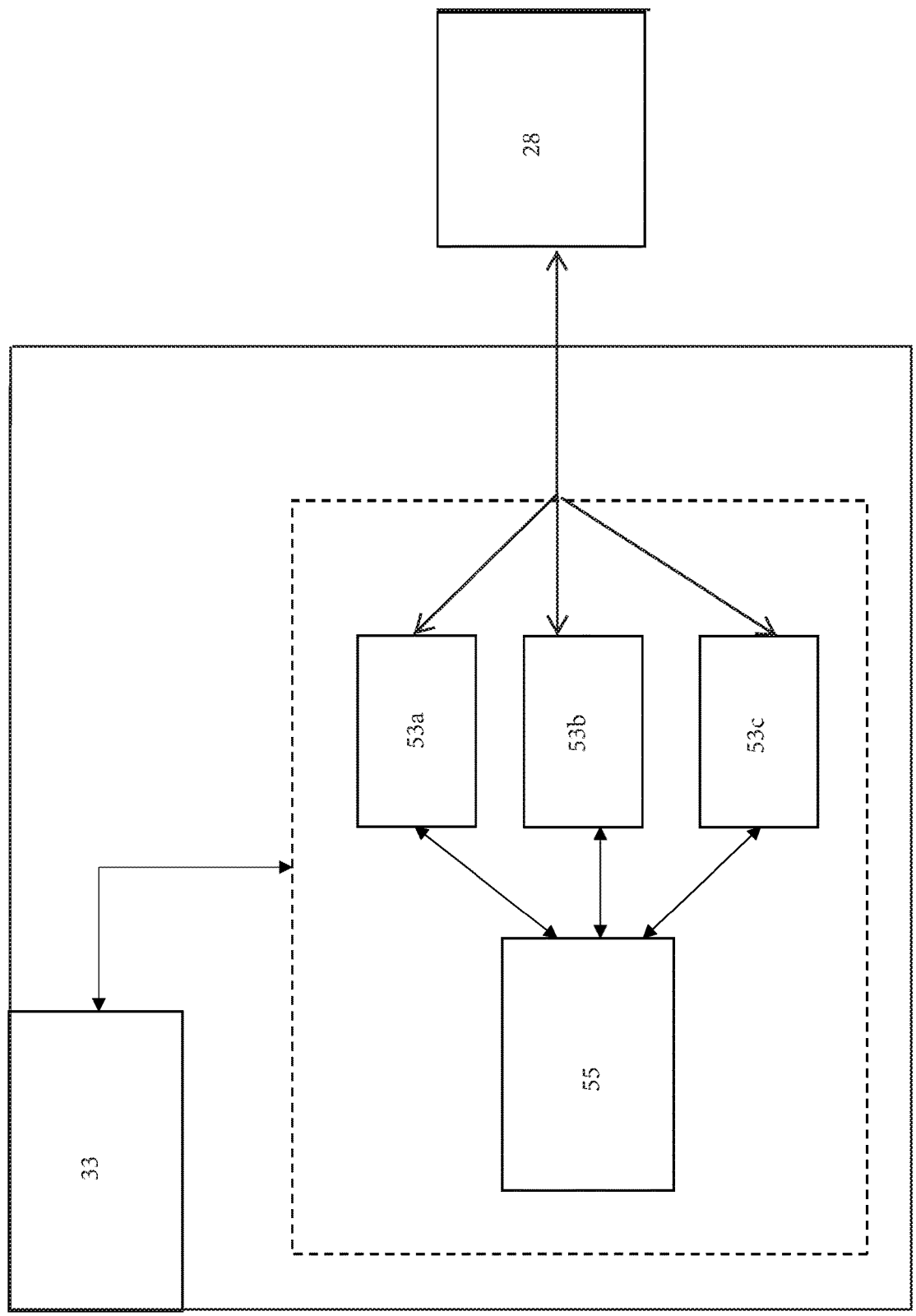
FIG. 5 is a block diagram of the interaction of the automated navigation program and diagnostic application programs resident on computer 30 of FIG. 1 illustrating the interface of the automated hierarchical navigation program with diagnostic applications in accordance with the present invention.

As illustrated in FIG. 4E, after diagnostic navigation program 55 provides an input signal of the vehicle model, the hierarchical structure of diagnostic application 53 subsequently provides a system selection display 68, which in the illustrated embodiment includes selectable options for vehicle systems that may be scanned by diagnostic application 53 as part of a diagnostic evaluation. In the illustrated embodiment this includes, the engine, transmission, body, chassis, brakes and suspension. Instead of operator 24 making a manual entry via keyboard 33, diagnostic navigation program 55 provides an automated input to diagnostic application 53 to select a system for diagnostic evaluation.

It should be appreciated that the hierarchical structure of diagnostic application 53 for a given vehicle can include additional branches from that shown in the illustrated embodiment of FIGS. 4A-4E. For example, selection of engine "(F0)" from system selection display 68 may result in a further subsystem selection display for engine controls, engine cooling, engine electrical, as well as others. Still additional branches may be included, and not all systems may include an equal number of branches. Upon reaching a terminating branch of the hierarchical structure of diagnostic application 53, diagnostic application 53 performs a diagnostic scan of the selected system, such as to determine diagnostic trouble codes ("DTCs"), and obtain a scan log file for the diagnostic evaluation to thereby enable the reading and reporting of fault codes in the electronic system of the vehicle such as may be located in ECUs of the vehicle.

It should be appreciated that upon completion of a scan of a vehicle system or subsystem, diagnostic navigation program 55 may be used to automatically navigate diagnostic application 53 to continue scanning one or more additional systems or subsystems of vehicle 22. Diagnostic navigation program 55 may thus be used to perform a complete scan of all vehicle systems of vehicle 22. Still further, initialization display 56 may be provided with one or more additional input fields, such as to enable an operator 24 to designate particular systems of vehicle 22 to be scanned, or designate that all systems of vehicle 22 are to be scanned. Particular diagnostic application programs, for example, may additionally or alternatively include internal tools may be provided that enable selection of a full scan of all electronic systems by way of a single selection or input to the diagnostic application program, such as under a tool options selection.

It should further be appreciated that each of diagnostic application programs 53a, 53b, 53c may be constructed with differing hierarchical structures, such as depending on the supplier of the program and/or depending on the differences in the vehicles for which a given diagnostic application program is useable. Accordingly, there will be a wide range of hierarchical structures depending on application program provider, vehicle, and other factors, with each diagnostic application program having its own series of inputs required to perform a diagnostic evaluation, with navigation program 55 configured for providing the inputs. Navigation program 55 may provide inputs at sequential spaced times, or may receive prompts from the diagnostic application program 53 for triggering the next sequential input to be provided. Automated navigation program 55 is thus configured to auto-click through the hierarchical structure of diagnostic application programs 53 to aid in the initialization of a diagnostic evaluation scanning of the electronic system 23 of vehicle 22.

In a particular embodiment navigation program 55 may be, for example, configured for learning programming, whereby navigation program 55 is programed by recording of the inputs received from an operator 24 for a given make, model and year vehicle. Upon a subsequent diagnostic evaluation for a similar make, model and year vehicle, navigation program 55 may be used as described above to automatically navigate the hierarchical structure of the appropriate diagnostic application 53.

It should further be appreciated that a diagnostic evaluation of a vehicle, such as vehicle 22, using a given diagnostic application 53 and automated navigation program 55 may still require intermittent human intervention. For example, certain actions may need to be taken on vehicle 22, or detailed information regarding vehicle 22 may need to be supplied to diagnostic application program 53. Accordingly, navigation program 55 may provide for occasional input screens to be supplied to an operator 24 for entry of additional information and/or prompting operator 24 to take some action, which may also include requiring operator 24 to enter confirmation of the action.

In an alternative embodiment automated navigation program 55 may additionally or alternatively interrogate electronic system 23 of vehicle 22 for operatively controlling navigation program 55 to select and/or navigate the hierarchical structure of a given diagnostic application program 53. For example, navigation program 55 may obtain the vehicle identification number (VIN) from the electronic system 23 of vehicle 22 via vehicle interface device 28. Navigation program 55 may then parse the alphanumeric VIN to determine information regarding the vehicle 22 under evaluation. This may include, for example, reading particular digits of the VIN to ascertain information such as the year, make and model of the vehicle, or to ascertain vehicle configuration information, such as the type of engine, transmission, vehicle accessories, or other particular vehicle features. Still further, navigation program 55 may be used to interrogate particular components of the electronic system 23 of vehicle 22 via vehicle interface device 28. For example, automated navigation program 55 may be used to ascertain part numbers of ECUs of vehicle 22 for operatively controlling navigation program 55 to select and/or navigate the hierarchical structure of a given diagnostic application program 53.

As understood from FIGS. 1 and 2, system 20 may also be employed in connection or together with a remote computer 70 that is accessible via an Internet 72 connection, whereby one or both of vehicle interface device 28 and local computer 30 may be connected to the remote computer 70. In such an embodiment a remote technician 74 may access computer 30 for aiding in performing a vehicle diagnostic evaluation of vehicle 22 by running a diagnostic scan of the electronic system 23 using a diagnostic application program 53. Remote technician may, for example, interface with automated navigation program 55 to launch the required diagnostic application program 53. Still further, diagnostic application program 53 may reside on remote computer and remotely interface with a diagnostic application program 53 residing on computer 30. Accordingly, remote computer 70 may be used to operate local computer 30, and in particular to operate diagnostic scanning programs and automated navigation program 55 independent from actions by a local operator, such as mechanic 24.

It should be appreciated that although in the illustrated embodiment the computer 30 is disclosed as a laptop having a keyboard 33 that alternative computers may be employed within the scope of the present invention, including tablets, custom handheld computer devices, and the like, where such a computer device may include one or more processors, memory for storage of programs, and a screen or be linked to a screen. Still further, the computer may include alternative keyboard arrangements, including push buttons, and need not be a full keyboard such as is associated with a conventional laptop computer. Moreover, it should additionally be appreciated that automated diagnostic navigation program 55 and/or diagnostic application program 53 may be written in more than one program, where such programs are interoperable together to, for example, provide automated navigation of the hierarchical structure of the diagnostic application and/or provide a diagnostic evaluation of the electronic system 23 of the vehicle 22. Still further, separate diagnostic navigation programs may be provided for use with different diagnostic application programs.

In the illustrated embodiment of FIGS. 1 and 2, vehicle interface device 28 and local computer 30 are shown as separate components making up a local computer system, that is with local computer 30 being proximate at the repair facility 25 such that it is proximate the vehicle 22. In an alternative arrangement, interface device 28 and computer 30 may be integrated in a single computer device, which would likewise be proximate the vehicle at the repair facility. Still further, the illustrated embodiment discloses diagnostic evaluation tools 52 as residing on local computer 30. It should be appreciated, however, that diagnostic evaluation tool 52 may reside on remote computer 70.

Other changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of diagnosing a vehicle comprising:
   providing a diagnostic computer having a diagnostic application program operable to perform a diagnostic evaluation of a vehicle by performing a diagnostic scan of an electronic system of the vehicle, wherein the diagnostic application program includes a hierarchical structure for initiation of a diagnostic scan of the vehicle based on the make, model and year of the vehicle, and wherein the diagnostic application program requires a plurality of entries to navigate the hierarchical structure and initiate a diagnostic scan;
   providing a diagnostic navigation program configured to interface with the diagnostic application program;
   providing an input to the diagnostic navigation program of the make, model and year of the vehicle;
   providing from the diagnostic navigation program a plurality of automated sequential inputs to the diagnostic application program based on the make, model and year of the vehicle to navigate the hierarchical structure of the diagnostic application program to initiate and perform the diagnostic scan of the vehicle.

2. The method of claim 1, wherein said diagnostic navigation program resides on said diagnostic computer.

3. The method of claim 1, wherein said diagnostic computer includes a plurality of diagnostic application programs configured for use with different makes, models and/or years of vehicles.

4. The method of claim 1, wherein said diagnostic computer comprises a laptop computer.

5. The method of claim 1, wherein said providing the input to the diagnostic navigation program comprises providing a manually input entry by an operator via the diagnostic computer of the make, model and year of the vehicle.

6. The method of claim 1, wherein said providing the input to the diagnostic navigation program comprises providing a vehicle identification number of the vehicle to said diagnostic computer, and parsing the vehicle identification number to determine the make, model and year of the vehicle.

7. The method of claim 6, further wherein said providing the vehicle identification number of the vehicle to said diagnostic computer comprises reading the vehicle identification number from the electronic system of the vehicle by said diagnostic computer when said diagnostic computer is connected with the electronic system of the vehicle.

8. The method of claim 1, further comprising providing selective manual inputs by an operator via the diagnostic computer in addition to said providing from the diagnostic navigation program automated sequential inputs to the diagnostic application program based on the make, model and year of the vehicle further comprises to initiate and perform the diagnostic scan of the vehicle.

9. The method of claim 1, further including providing a remote computer communicatively coupled to the diagnostic computer via an Internet connection, and wherein said diagnostic navigation program resides on said remote computer.

10. The method of claim 1, further comprising wherein said providing from the diagnostic navigation program automated sequential inputs to the diagnostic application program comprises providing automated sequential inputs via a controller of said diagnostic computer.

11. The method of claim 1, further comprising providing a vehicle interface device operable to connect with the electronic system of the vehicle and with the diagnostic computer, and wherein the diagnostic application program is operable to scan the electronic system of the vehicle via the vehicle interface device.

12. A vehicle diagnostic system comprising:
    a diagnostic computer having a diagnostic application program operable to perform a diagnostic evaluation of a vehicle by performing a diagnostic scan of an electronic system of the vehicle, wherein said diagnostic application program includes a hierarchical structure for initiation of a diagnostic scan of the vehicle based on the make, model and year of the vehicle, and wherein the diagnostic application program requires a plurality of entries to navigate the hierarchical structure and initiate a diagnostic scan;
    a diagnostic navigation program configured to interface with said diagnostic application program, wherein said diagnostic navigation program is configured to receive an input of the make, model and year of the vehicle;
    wherein said diagnostic navigation program is operable to provide a plurality of automated sequential inputs to said diagnostic application program based on the make, model and year of the vehicle to navigate the hierarchical structure of said diagnostic application program to initiate and perform the diagnostic scan of the vehicle.

13. The vehicle diagnostic system of claim 12, wherein said diagnostic navigation program resides on said diagnostic computer.

14. The vehicle diagnostic system of 12, wherein said diagnostic computer includes a plurality of diagnostic application programs configured for use with different makes, models and/or years of vehicles.

15. The vehicle diagnostic system of claim 12, wherein said diagnostic computer comprises a laptop computer.

16. The vehicle diagnostic system of claim 12, wherein said diagnostic navigation program is configured to receive a manually input entry by an operator via the diagnostic computer of the make, model and year of the vehicle.

17. The vehicle diagnostic system of claim 12, further including a vehicle interface device, and wherein said diagnostic computer is configured to receive a vehicle identification number from the vehicle via the vehicle interface device, with the vehicle identification number including indicia of the make, model and year of the vehicle.

18. The vehicle diagnostic system of claim 12, wherein said diagnostic application program is additionally configured to receive selective manual inputs by an operator via the diagnostic computer to initiate and perform the diagnostic scan of the vehicle.

19. The vehicle diagnostic system of claim 12, further including a remote computer configured to be communicatively coupled to the diagnostic computer via an Internet connection, and wherein said diagnostic navigation program resides on said remote computer.

20. The vehicle diagnostic system of claim 12, wherein said diagnostic computer includes a controller, and wherein said diagnostic navigation program is operable to provide automated sequential inputs to said diagnostic application program via said controller.

21. The vehicle diagnostic system of claim 12, further comprising a vehicle interface device operable to connect with the electronic system of the vehicle and with said diagnostic computer, and wherein said diagnostic application program is operable to scan the electronic system of the vehicle via said vehicle interface device.

* * * * *